(12) United States Patent
Maszull et al.

(10) Patent No.: US 8,578,964 B2
(45) Date of Patent: Nov. 12, 2013

(54) BLEEDING SCREW HAVING A KICK-BACK VALVE

(76) Inventors: Martin Maszull, Hattingen (DE); Peter Rösler, Velbert (DE); Thomas Wittrock, Bochum (DE)

( * ) Notice: Subject to any disclaimer, the term of this patent is extended or adjusted under 35 U.S.C. 154(b) by 823 days.

(21) Appl. No.: 11/922,513

(22) PCT Filed: Jun. 19, 2006

(86) PCT No.: PCT/EP2006/005858
§ 371 (c)(1),
(2), (4) Date: Feb. 26, 2008

(87) PCT Pub. No.: WO2006/136354
PCT Pub. Date: Dec. 28, 2006

(65) Prior Publication Data
US 2009/0212249 A1 Aug. 27, 2009

(30) Foreign Application Priority Data
Jun. 20, 2005 (DE) .......................... 10 2005 028 645

(51) Int. Cl.
*B60T 11/30* (2006.01)
*F16K 15/18* (2006.01)

(52) U.S. Cl.
USPC ............. 137/523; 137/539; 137/901; 251/86; 188/352

(58) Field of Classification Search
USPC ............. 137/522, 523, 539, 901; 251/82, 83; 188/352
See application file for complete search history.

(56) References Cited

U.S. PATENT DOCUMENTS

| 230,173 | A | * | 7/1880 | Brandeis | 137/901 |
|---|---|---|---|---|---|
| 625,338 | A | * | 5/1899 | Kolben | 137/901 |
| 994,268 | A | * | 6/1911 | Milne et al. | 137/901 |
| 1,115,256 | A | * | 10/1914 | Torbert | 137/901 |
| 1,275,783 | A | * | 8/1918 | Steinmetz | 137/901 |
| 1,334,566 | A | * | 3/1920 | Steinmetz | 251/82 |
| 1,693,676 | A | * | 12/1928 | Spinelle | 251/82 |
| 2,729,228 | A | | 1/1956 | Stevenson | |
| 2,892,614 | A | | 6/1959 | Majneri | |

(Continued)

FOREIGN PATENT DOCUMENTS

DE 22 27 453 1/1973
WO WO 00/40445 7/2000

OTHER PUBLICATIONS

International Search Report, PCT/EP2006/005858, Oct. 6, 2006.

*Primary Examiner* — John Rivell
(74) *Attorney, Agent, or Firm* — Collard & Roe, P.C.

(57) ABSTRACT

The invention relates to a device for bleeding a hydraulic system. The bleeding device comprises a venting passage which can be closed by means of a valve arrangement. In order to simplify such a bleeding device regarding the operation thereof while preventing air from being delivered in an uncontrolled manner during the bleeding process, the valve arrangement is provided with a valve member (S) which can be lifted from a valve seat (8) of the valve arrangement counter to the force of a spring element (7) in an open position of the bleeding device while being fixed to the valve seat (8) in a closed position of the bleeding device. The invention further relates to a venting screw which encompasses such a valve arrangement according to the principle of a check valve and is to be mounted in a caliper (18).

7 Claims, 5 Drawing Sheets

(56) References Cited

U.S. PATENT DOCUMENTS

| | | |
|---|---|---|
| 3,802,461 A | 4/1974 | Witt |
| 4,524,800 A | 6/1985 | Holland |
| 4,834,140 A | 5/1989 | Schmidt |
| 4,989,639 A * | 2/1991 | Sulwer .......................... 188/352 |
| 5,960,922 A * | 10/1999 | Riess et al. .................... 188/352 |
| 2006/0284128 A1* | 12/2006 | Dong .............................. 251/83 |

* cited by examiner

BLEEDING SCREW HAVING A KICK-BACK VALVE

CROSS-REFERENCE TO RELATED APPLICATIONS

Applicant claims priority under 35 U.S.C. §119 of German Application No. 10 2005 028 645.3 filed Jun. 20, 2005. Applicant also claims priority under 35 U.S.C. §365 of PCT/EP2006/005858 filed Jun. 19, 2006. The international application under PCT article 21(2) was not published in English.

The invention relates to a bleeding device for bleeding a hydraulic system, having a bleeding passage that can be closed off by means of a valve assembly.

Such bleeding devices are suitable, for example, for bleeding brake lines of hydraulic brake systems, or also for bleeding the hydraulic systems of hydraulic clutches. In the following, the use of bleeding devices for bleeding hydraulic brake systems of motor vehicles will mainly be described. However, the invention relates to a bleeding device that is also suitable for any other hydraulic system.

It is known that hydraulic brake systems must be bled at the individual brakes when they are filled with brake fluid, in order to ensure that the entire system, including the brake lines, is exclusively filled with hydraulic fluid and does not contain any air. Since air is compressible, the braking force would be transferred to the brake only insufficiently, or with a delay, if there were air inclusions in the brake system.

It is generally usual to provide one bleeding device, in each instance, on each brake of a vehicle. This bleeding device is generally configured in the form of a bleeding screw. This screw has a sealing cone that closes off an opening of the hydraulic brake system, forming a seal. For bleeding, the bleeding screw can be loosened, so that air can escape through a bleeding passage, going past the sealing cone. In most cases, the bleeding passage is an axial bleeding bore of the bleeding screw. After the air has escaped, the bleeding screw is tightened, whereby the sealing cone is firmly pressed against the metallic seat of the brake. This press-down pressure must be relatively great, in order to prevent the bleeding screw from coming loose due to vibrations or other mechanical stress.

Furthermore, it is known to set a bleeding hose onto the bleeding screw of a hydraulic brake system during bleeding, whose free end ends in a vessel into which the hydraulic fluid, i.e. brake fluid flows off. In this connection, the exit of air from the system can be observed in the form of bubbles in the hydraulic fluid.

A bleeding device of the type described above is disclosed, for example, in the German Auslegeschrift [examined patent application published for public scrutiny before final issuance] 22 27 453. In the case of the bleeding device previously known from this reference, a kick-back valve that consists of a rubber sleeve turned inside out is set onto the bleeding screw. This kick-back valve has the function of preventing the return of air into the hydraulic brake system.

The previously known bleeding devices have a number of disadvantages.

In the case of vehicles having conventional bleeding screws, the bleeding process of the brake system takes place in such a manner that the brake cylinder is activated while the bleeding screw is open. When this happens, the air and the brake fluid contained in the brake system are pressed through the bleeding screw and the bleeding hose set onto it, into the vessel that stands ready. When the brake cylinder is fully activated, the bleeding screw is now closed once again, in order to prevent a return flow of brake fluid, i.e. an intake of air into the brake system.

Then the brake cylinder is released, before the bleeding screw is opened and the process is repeated. In order to bleed the hydraulic brake system completely, this cycle has to be repeated several times. As a rule, two persons are needed for this, namely one person who activates the brake cylinder, and one person who alternately opens and closes the bleeding screw. Thus, the usual method of procedure for filling and bleeding brake systems is disadvantageously complicated and time-consuming, if only because of the personnel effort involved.

It is a further disadvantage of the known bleeding screws that when the screw is loosened, brake fluid is pressed out of the brake system, by way of the thread, going past the bleeding screw on the side. This brake fluid can get onto body parts of the vehicle and cause paint damage there, because of its aggressive properties.

It is true that the bleeding process is simplified with a bleeding screw that is equipped with a kick-back valve in accordance with the Auslegeschrift 22 27 453. However, the problems last mentioned, which result from unavoidable leaks in the region of the thread of the loosened bleeding screw, cannot be eliminated by means of the use of the kick-back valve. In addition, there is the problem that because of the leaks in the region of the thread of the loosened bleeding screw, air continues to be drawn in, whenever the brake cylinder is released. Therefore, residual air always remains in the system, and the kick-back valve of the previously known bleeding screw cannot prevent this.

In front of this background, it is the task of the invention to make available a bleeding device that can be handled easily and with little effort. Furthermore, during the bleeding process, air is supposed to be reliably prevented from being drawn into the brake system, and brake fluid is supposed to be reliably prevented from being pressed out of the system, in uncontrolled manner.

The invention accomplishes this task, proceeding from a bleeding device of the type stated initially, in that the valve assembly comprises a valve body that can be lifted off a valve seat of the valve assembly in a bleeding position of the bleeding device, against the force of a spring element, and that is placed firmly against the valve seat in a closed position of the bleeding device.

The bleeding device according to the invention is characterized by the special configuration of the valve assembly. This assembly functions according to the principle of a kick-back valve, whereby the valve is opened by means of the pressure within the brake line, during the bleeding process, against the force of the spring element. The valve assembly of the bleeding device according to the invention therefore opens only when a certain pressure within the brake system has been exceeded. Once pressure on the brake system has been relieved, the valve closes, in that the valve body is pressed into the valve seat by means of the force of the spring element. Thus, air is effectively prevented from being drawn into the brake system in uncontrolled manner. When the bleeding process begins, the bleeding device according to the invention is brought into the bleeding position, so that the valve body can move against the force of the spring element. After bleeding is complete, the device according to the invention is brought into the closed position, in which the valve body is firmly placed against the valve seat, so that it can no longer move. Thus in the closed position it is assured that the brake system is sealed. The valve assembly cannot be opened in the closed position, because of the brake pressure. Thus it becomes clear that the bleeding device according to the invention can be handled in particularly simple and reliable manner. The bleeding device only has to be brought into the open position at the beginning of the bleeding process. Then, the brake cylinder is activated until no exit of air through the bleeding passage can be observed any longer. Finally, the bleeding device is brought back into the closed position. Constant opening and closing during the bleeding process is not required.

According to an advantageous further development of the bleeding device according to the invention, a holding element is provided, by means of which the valve body can be permanently lifted off the valve seat in an open position of the bleeding device. Thus, the bleeding device according to the invention has three positions, namely the open position for draining hydraulic fluid from the hydraulic system or for filling the hydraulic system with hydraulic fluid, the bleeding position for bleeding the hydraulic system, and the closed position, in which the hydraulic system is completely closed and sealed with regard to the surroundings. The holding element guarantees that the valve body can be actively lifted off the valve seat in the open position. This is a prerequisite for assuring that filling of the hydraulic system can be carried out using a vacuum pump. The vacuum pump is connected to the bleeding device and connected with the bleeding passage of the bleeding device. The valve body could not be lifted off the valve seat solely by means of the vacuum, against the force of the spring element. The holding element is therefore absolutely necessary for filling by means of a vacuum pump.

According to a practical embodiment of the bleeding device according to the invention, a screw body that can be screwed into the hydraulic system is provided, whereby the bleeding passage is configured as an axial bleeding channel that extends through the screw body, whereby the valve body is guided to be axially movable in the bleeding channel, specifically in such a manner that in the bleeding position and in the open position, hydraulic fluid or air can flow past the side of the valve body in the bleeding channel.

The screw body of the bleeding device according to the invention replaces a conventional bleeding screw. According to the invention, the valve assembly is integrated into the screw. The aforementioned holding element can advantageously be configured as a holding cage connected with the screw body, which cage accommodates the valve body. Thus, all of the elements that are essential for the function of the bleeding device according to the invention are an integral component of the screw. The holding cage can comprise at least two holding claws oriented axially, which are disposed around the bleeding channel, spaced apart from one another. The holding claws engage on the valve body and bring about the result that the latter is actively lifted off the valve seat in the open position of the bleeding device.

The screw body of the bleeding device according to the invention can be configured in one piece and can be screwed directly into a caliper of a hydraulic brake system, for example, as a replacement for a conventional bleeding screw. For this purpose, the screw-in opening on the caliper must be adapted to the configuration of the screw body according to the invention, if necessary. For retrofitting a hydraulic system designed for a conventional bleeding screw with the bleeding device according to the invention, a configuration in which the screw body is designed in two parts is suitable. In this case, the screw body comprises a head part and a foot part that can be screwed together with the head part, whereby the bleeding channel extends through the head part and the foot part of the screw body. The foot part essentially fulfills the function of an adapter piece between the head part of the screw body, into which the essential functional elements of the bleeding device according to the invention are integrated, and the related screw-in opening of the hydraulic system. In this connection, the valve seat of the valve assembly is configured on the foot part of the screw body, whereby the spring element rests against the head part. In the bleeding position of the bleeding device, the valve body can be moved within the screw body, against the force of the spring element. In order to bring the bleeding device out of the bleeding position into the closed position, the head part of the screw body is tightened on the foot part. When this is done, the valve body is firmly placed against the valve seat of the foot part, at the same time, so that the kick-back valve is blocked after the bleeding process has been finished. In the case of this embodiment of the bleeding device according to the invention, it is practical if the holding cage for the valve body is connected with the head part of the screw body. In the open position, the head part of the screw body is loosened to such an extent that the valve body is actively lifted off the valve seat formed on the foot part.

It is practical if, in the case of the bleeding device according to the invention, the screw body is provided with a connection nipple for setting on a bleeding hose, at its upper end. The brake fluid drained from the brake line can be guided to an appropriate vessel by means of the bleeding hose. At the same time, the exit of air from the brake system can be observed.

Furthermore, the foot part of the screw body, in the case of the bleeding device according to the invention, should have a threaded segment for screwing the foot part into the hydraulic system (for example into a caliper), and should be equipped with a sealing cone for creating a sealing connection with the hydraulic system, at its lower end. A bleeding device equipped in this manner can serve as a replacement for conventional bleeding screws, for example for retrofitting. For this purpose, the threaded segment on the foot part of the screw body must agree with the thread of a conventional bleeding screw, and likewise, the sealing cone must be configured in accordance with a conventional bleeding screw.

The screw body of the bleeding device according to the invention, consisting of head part and foot part, is particularly advantageous, because the foot part is firmly screwed into the hydraulic system, so that leaks in the region of the thread between brake and screw body can never occur. To open the bleeding device, it is not the connection between screw body and brake that is loosened—as is the case with conventional bleeding screws—but rather the screw connection between head part and foot part of the screw bodies is loosened to such an extent that the valve body of the valve assembly can move within the screw body. Then it is practical if the head part and the foot part are guided on one another in sealing manner, so that no brake fluid can exit from the bleeding channel between head part and foot part, in uncontrolled manner.

A variant of the bleeding device according to the invention that is particularly practical and can be produced in cost-advantageous manner is obtained if the valve body is configured in spherical shape. For example, a simple helical spring can be used as a spring element. According to a particularly preferred embodiment, the screw body has a collar-shaped accommodation segment for the helical spring, whereby the diameter of the accommodation segment is smaller than the diameter of the valve body. The valve body is then wedged in between the end-side ring collar of the accommodation segment and the valve seat (for example in the shape of a cone), in the closed position.

In the simplest case, the bleeding device according to the invention consists of only three parts. These are the screw body, the valve body, and the spring element. In addition, there can be a sealing element, if necessary, for example in the form of an O-ring, so that a sufficient seal is provided in the thread region. In every case, exit of hydraulic fluid in the region of the thread should be prevented.

Not only a bleeding device of the type described above, but also a bleeding screw for such a bleeding device is an object of the invention. The bleeding screw according to the invention is characterized in that a continuous axial bleeding channel for bleeding a hydraulic system is formed in the screw body of the bleeding screw, whereby a valve body is guided to be axially movable in the bleeding channel, specifically in such a manner that in a bleeding position and in an open position of the bleeding screw, hydraulic fluid or air can flow past the side of the valve body in the bleeding channel. Such a bleeding screw can be used as a replacement for conventional bleeding screws, for example for brake systems of motor vehicles. If necessary, the screw-in opening for the bleeding screw must be adapted to the configuration of the screw body of the bleeding screw, according to the invention. It is particularly advantageous that all of the functional elements of the bleeding screw can be integrated into the screw body.

Exemplary embodiments of the invention will be explained in greater detail in the following, making reference to the drawings. These show.

Figure 1:
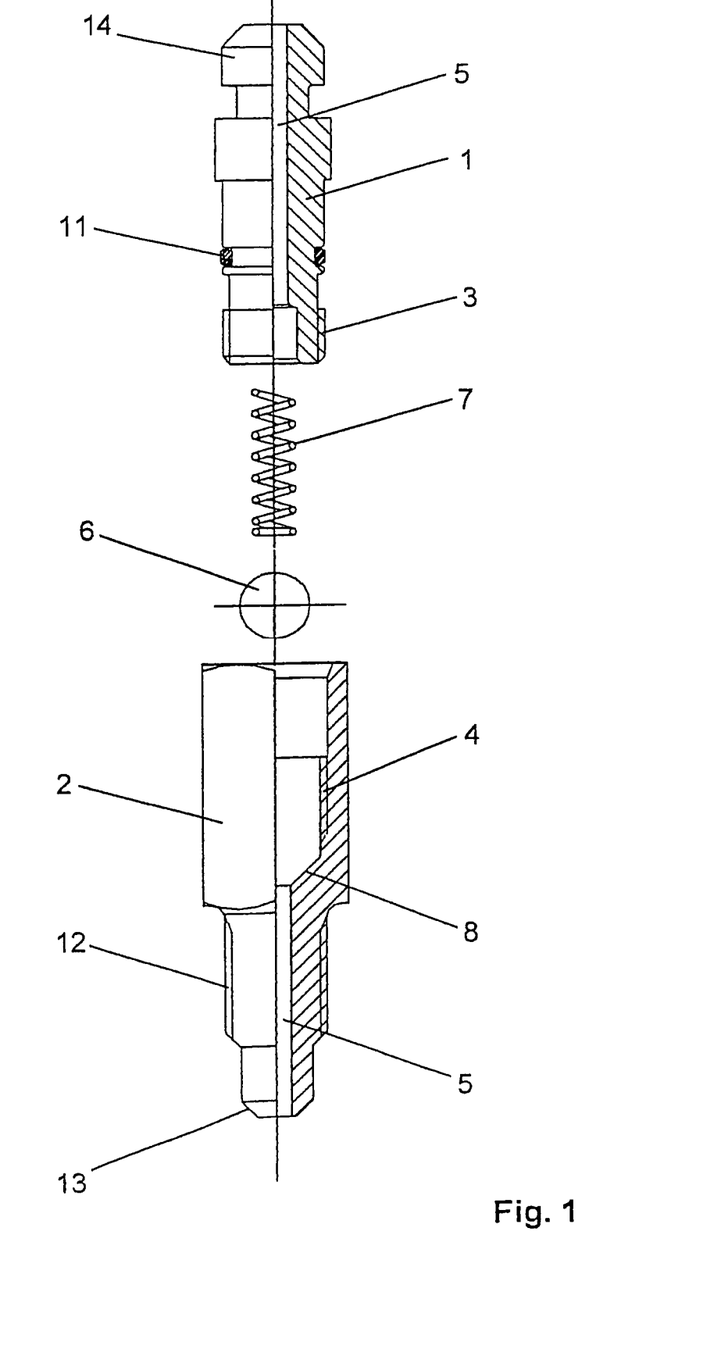
FIG. 1 side view, partly in section, of a bleeding device according to the invention, in the disassembled state.
Figures 2, 3:
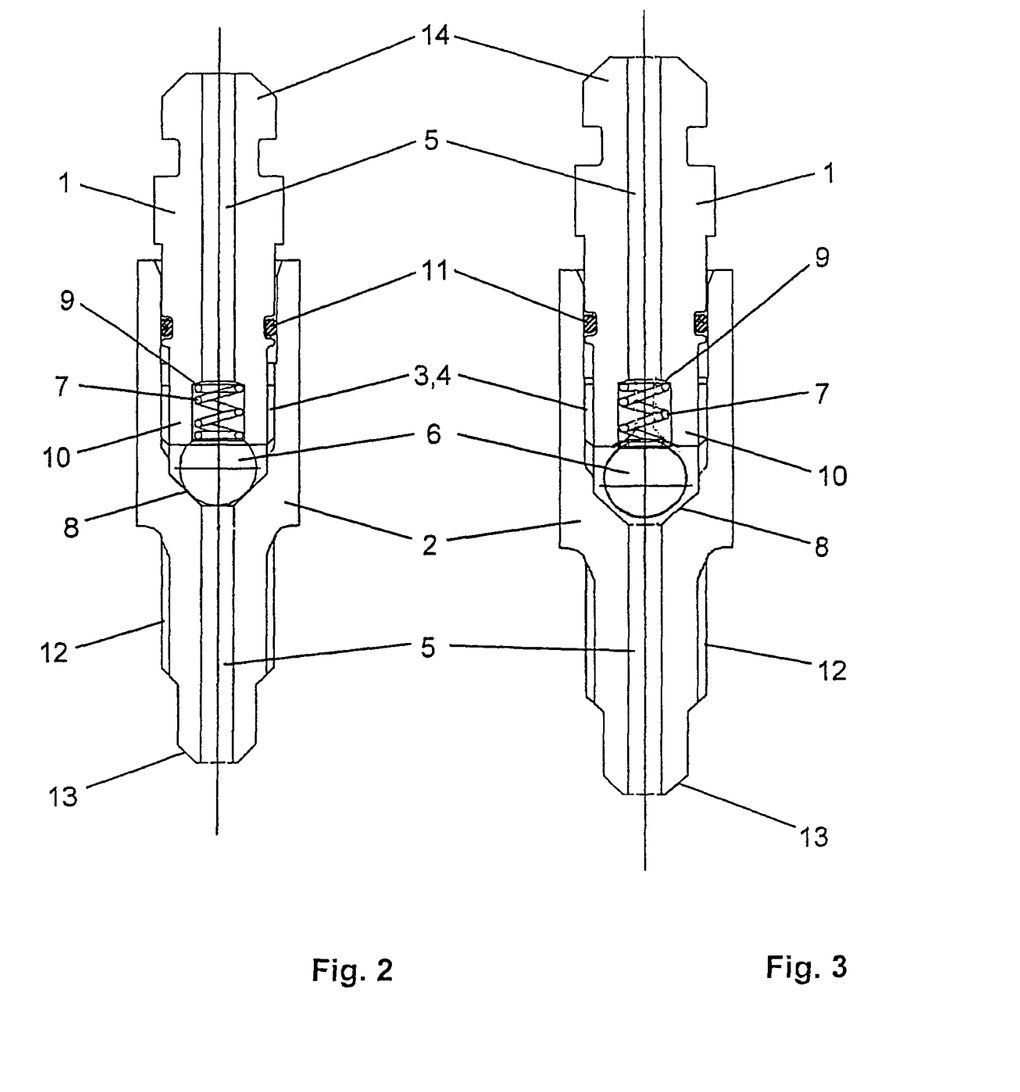
FIG. 2 side view of the bleeding device, in section, in the closed position.
FIG. 3 bleeding device in the bleeding position.

The bleeding device shown in FIGS. 1 to 3 serves for filling and bleeding a brake line of a hydraulic brake system, not shown in any detail. The bleeding device consists of a two-part screw body that can be screwed into the brake system. This body comprises a head part 1 and a foot part 2. The head part 1 can be screwed together with the foot part 2 by way of an outside thread 3 of the head part 1 and a related inside thread 4 of the foot part 2. The bleeding device has a bleeding passage. This passage is configured as an axial bleeding channel 5 that extends through the head part 1 and the foot part 2, in the case of the exemplary embodiment shown in the figures.

Furthermore, the bleeding device has a valve assembly that works according to the manner of a kick-back valve. The valve assembly comprises a spherical valve body 6 that can be lifted off a cone-shaped valve seat surface 8 within the foot part 2, against the force of a helical spring 7. In this connection, the spring 7 is supported on a ring-shaped shoulder 9 within the head part 1. The head part 1 of the screw body has a collar-shaped accommodation segment 10 for the helical spring 7 on its lower end, as can be seen well in FIGS. 2 and 3. This segment results from a stepped bore within the head part 1. In the region of the accommodation segment 10, the axial bore of the head part 1 is widened as compared with the bleeding channel 5. In this connection, however, the diameter is still smaller than that of the spherical valve body 6. This guarantees that the valve body, as shown in FIG. 2, is wedged in between the end-side ring collar of the accommodation segment 10 and the valve seat 8 configured in cone shape, in the closed position. This position is achieved by means of tightening the head part 1 on the foot part 2.

The bleeding device is brought into the bleeding position, which is shown in FIG. 3, in that the head part 1 is loosened by rotating it relative to the foot part 2. In this connection, the head part 1 moves upward relative to the foot part 2, and the valve body 6 is given the opportunity to move axially within the screw body. When the brake system is bled, the valve body 6 is lifted off the valve seat 8 of the valve assembly shown, against the force of the spring 7, so that brake fluid or air can be drained off through the bleeding channel 5 of the foot part 2, past the side of the valve body 6, and then out of the brake line through the bleeding channel 5 of the head part 1. When the pressure in the brake system decreases, the valve body 6 is pressed into the valve seat 8 by the spring 7, in the bleeding position of the bleeding device, so that drawing air into the brake system from the surroundings is precluded. Leaks in the region of the thread 3 and 4 do not impair the function of the bleeding device according to the invention, since the head part 1 and the foot part 2 are guided on one another in sealed manner, by means of an O-ring 11 that lies in a ring groove of the head part 1. Thus, no brake fluid can exit through the ring gap between head part 1 and foot part 2 of the screw body, in uncontrolled manner.

The exemplary embodiment of the bleeding device according to the invention shown in FIGS. 1 to 3 is intended as a replacement for conventional bleeding screws. For this reason, the foot part 2 has a threaded segment 12 for screwing the foot part 2 into the brake system. At the lower end of the foot part 2, a sealing cone 13 for forming a sealed connection with the brake line to be bled is provided.

Figure 4:
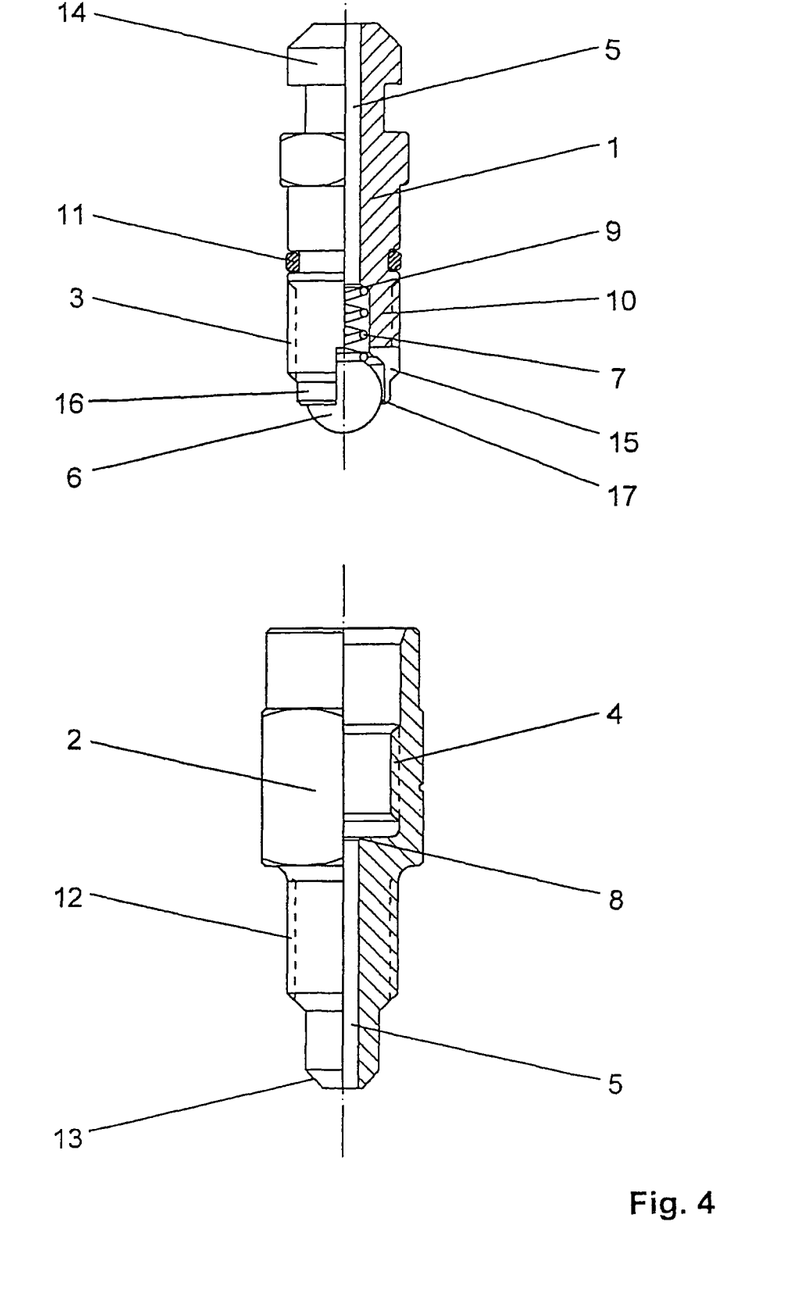
FIG. 4 side view, partly in section, of an alternative embodiment of the bleeding device according to the invention.
Figure 5:
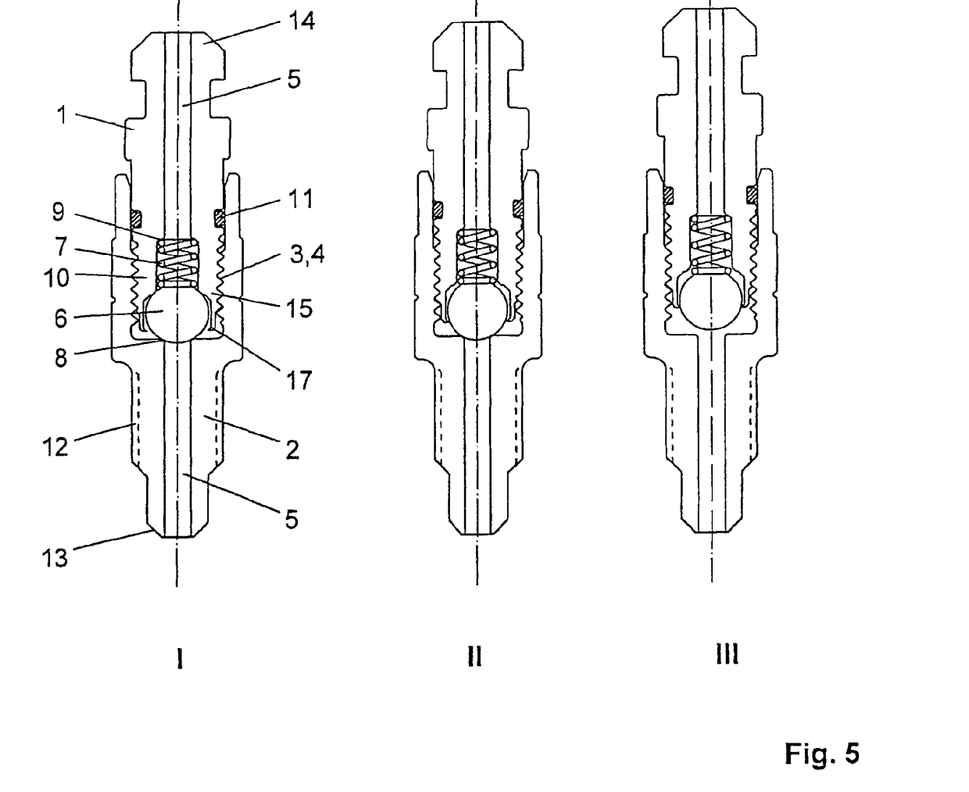
FIG. 5 side view, in section, of the bleeding device according to FIG. 4, in the various functional positions.

The exemplary embodiment shown in FIGS. 4 and 5 differs from the exemplary embodiment according to FIGS. 1 to 3 by an additional holding cage 15 on the underside of the head part 1. The holding cage accommodates the spherical valve body 6, so that the latter can be actively lifted off the valve seat 8 by means of unscrewing the head part 1 from the foot part 2. This is necessary so that filling the brake system with brake fluid can take place using a vacuum pump. It would not be possible to lift the valve body 6 off the valve seat 8 against the force of the spring 7 by means of applying vacuum to the bleeding device. For this reason, the exemplary embodiment shown in FIGS. 1 to 3 is not well suited for vacuum filling. In the case of the exemplary embodiment shown, the holding cage 15 is formed by a total of four holding claws 16, oriented axially. The holding claws 16 have projections 17 that are directed inward, at their lower end, so that the valve body 6 is held on the head part 1 of the screw body against the force of the spring 7. The distance between the end-side projections 17 of holding claws 16 that lie opposite one another is smaller than the diameter of the valve body 6. The holding claws 16 are disposed around the bleeding channel 5. In the circumference direction, the holding claws 16 are spaced apart from one another by means of axial slits. The brake fluid or air can flow past the side of the spherical valve body 6 in the open position, i.e. in the bleeding position of the bleeding device, through the axial slits.

FIG. 5 shows the exemplary embodiment of the bleeding device according to the invention shown in FIG. 4 in the various functional positions. I refers to the closed position, II to the bleeding position, and III to the open position. In the closed position I, the head part 1 of the screw body is tightened on the foot part 2. In this position, the valve body 6 is wedged between the cone-shaped transition region between accommodation segment 10 and holding cage 15 and the valve seat 8, which is also configured in cone shape. In the bleeding position, the head part 1 is slightly loosened from the foot part 2 (for example by means of rotation by half a rotation). In the bleeding position, the valve body 6 can be lifted off the valve seat 8 against the force of the spring 7. In the bleeding position, bleeding of the brake system can take place as described above, making reference to FIGS. 1 to 3. In the open position III, the head part 1 is loosened further from the foot part 2 (for example by means of rotation by 1.5 rotations). In the open position, the end-side projections 17 of the holding cage 15 engage on the valve body 6 and actively lift it off the valve seat 8. In the open position, the bleeding device is freely passable.

Hydraulic fluid or air can flow through the axial slits between the holding claws 16, not shown in FIG. 5, past the valve body 6, through the bleeding channel 5.

Figure 6:
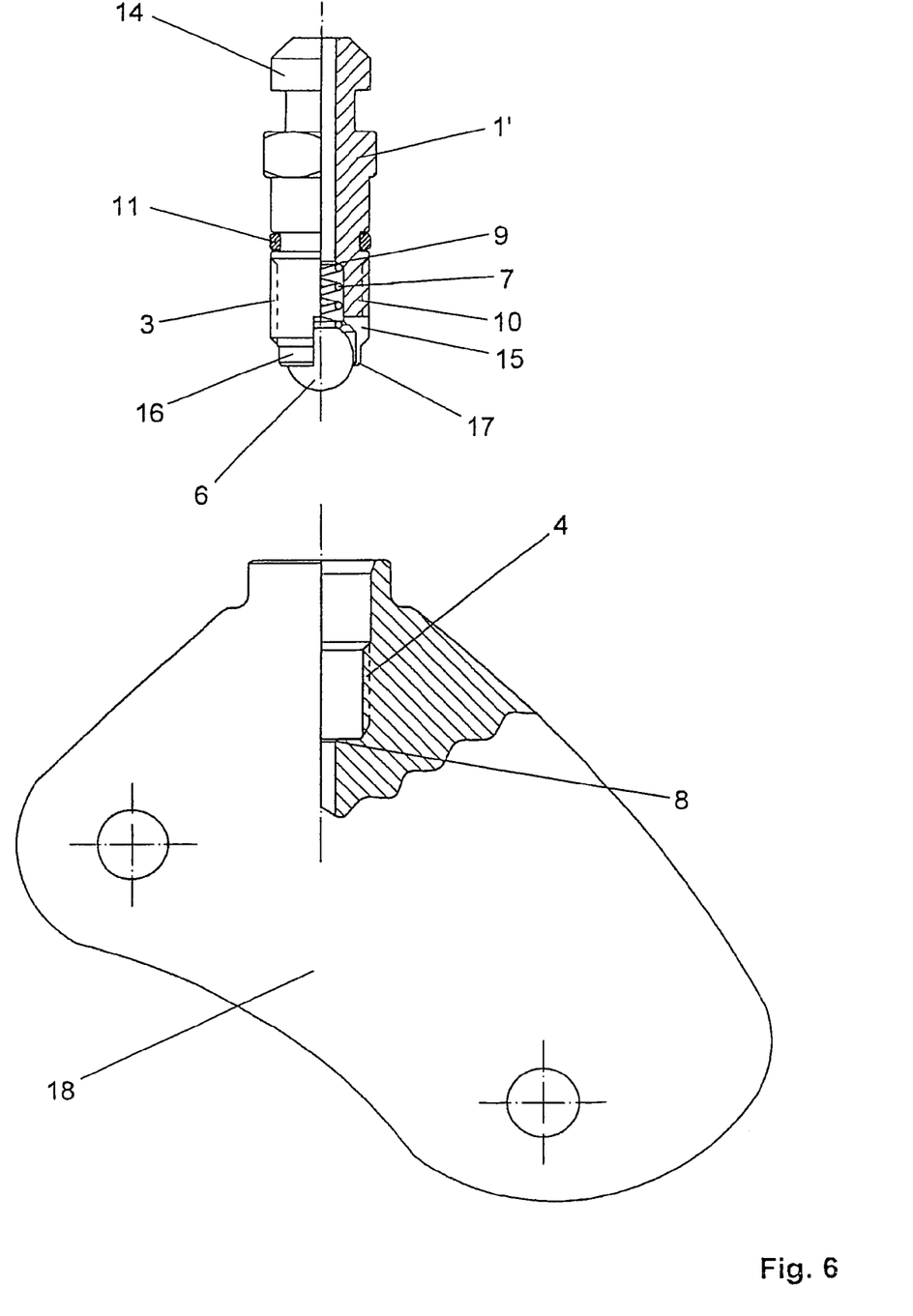
FIG. 6 bleeding screw according to the invention, with appropriately adapted caliper.

In the case of the exemplary embodiment of the bleeding screw according to the invention shown in FIG. 6, the screw body of the bleeding screw is indicated as 1'. The foot part 2 of the screw body shown in FIGS. 1 to 5 is configured essentially integral with a caliper 18, in the case of the exemplary embodiment shown in FIG. 6. In this manner, the bleeding device according to the invention can already be provided during the production of the brake system of a motor vehicle. The screw-in opening for the bleeding screw 1' formed on the caliper 18 has the cone-shaped valve seat 8 that is essential for the function. The inside thread 4 that interacts with the outside thread 3 of the bleeding screw 1' is provided on the inside of the screw-in opening. The essential thing is that the screw body 1' has an O-ring seal 11 on its outside, by means of which the screw body 1' is guided, in sealed manner, in the screw-in opening of the caliper 18. This seal prevents leaks in the region of the thread 3 and 4 between brake and screw body 1'. Therefore, it is assured, in particular, that no brake fluid can exit past the screw body 1', in uncontrolled manner. The return of air into the brake system during the bleeding process is already prevented by the valve body 6, with sufficient effectiveness.

In any case, it is practical if the screw body has a connection nipple 14 for setting on a bleeding hose, not shown in detail in the figures, at its upper end, as shown in the figures. In this way, the draining brake fluid can be guided into an appropriate vessel, as described above.

The invention claimed is:

1. A bleeding device for bleeding a hydraulic system, comprising a screw body that can be screwed into the hydraulic system and a valve assembly which is provided in the screw body and which includes a valve body that can be lifted off a valve seat of the valve assembly in a bleeding position of the bleeding device, against the force of a spring element, and that is placed firmly against the valve seat in a closed position of the bleeding device, thereby closing a bleeding passage of the bleeding device, wherein the screw body comprises a head part and a foot part that can be screwed together with the head part via a thread,
the bleeding passage is configured as an axial bleeding channel that extends through the head part and the foot part of the screw body, the axial bleeding channel in the head part running coaxial to the axial bleeding channel in the foot part and running coaxial to the thread,
the valve body is guided to be axially movable in the bleeding channel along a movement path, specifically in such a manner that in the bleeding position hydraulic fluid or air can flow past the side of the valve body in the bleeding channel, the movement path running coaxial to the axial bleeding channel in the head part, to the axial bleeding channel in the foot part, and to the thread,
the valve seat of the valve assembly is configured on the foot part of the screw body, whereby the spring element is supported on the head part,
the valve body can be fixed in place on the valve seat in the closed position via tightening the head part on the foot part,
the bleeding device can be switched from the closed position into the bleeding position and from there further into an open position by relative rotation of the head part and the foot part,
provided on the head part of the screw body is a holding cage which accommodates the valve body and has end-side projections which engage on the valve body and actively lift it off the valve seat in the open position so that the bleeding channel is freely passable, and
the head part and the foot part are guided to be sealed on one another via a circumferential seal on the outside of the head part of the screw body in the closed position, in the bleeding position, and in the open position.

2. The bleeding device according to claim 1, wherein the holding cage comprises at least two holding claws oriented axially, which are disposed around the bleeding channel, spaced apart from one another.

3. The bleeding device according to claim 1, wherein the screw body has a connection nipple for setting on a bleeding hose, at its upper end.

4. The bleeding device according to claim 1, wherein the foot part has a threaded segment for screwing the foot part into the hydraulic system, and a sealing cone for creating a sealing connection with the hydraulic system, at its lower end.

5. The bleeding device according to claim 1, wherein the valve body is configured in spherical shape.

6. The bleeding device according to claim 1, wherein the spring element is a helical spring.

7. The bleeding device according to claim 6, wherein the screw body has a collar-shaped accommodation segment for the helical spring, the diameter of which is smaller than the diameter of the valve body, whereby the valve body is wedged in between the end-side ring collar of the accommodation segment and the valve seat, in the closed position.

\* \* \* \* \*

UNITED STATES PATENT AND TRADEMARK OFFICE
CERTIFICATE OF CORRECTION

PATENT NO.         : 8,578,964 B2
APPLICATION NO.    : 11/922513
DATED              : November 12, 2013
INVENTOR(S)        : Maszull et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this
Twenty-second Day of September, 2015

Michelle K. Lee
*Director of the United States Patent and Trademark Office*